United States Patent [19]
Greenwell

[11] 3,753,060
[45] Aug. 14, 1973

[54] INDUCTION MOTOR SYSTEM FOR TRACTION

[75] Inventor: Jack E. Greenwell, Reno, Nev.

[73] Assignee: Lear Motors Corporation, Reno, Nev.

[22] Filed: June 5, 1972

[21] Appl. No.: 259,771

Related U.S. Application Data

[63] Continuation of Ser. No. 144,897, May 19, 1971.

[52] U.S. Cl. .............................. 318/227, 318/225 R
[51] Int. Cl. ............................................. H02p 5/40
[58] Field of Search ................ 318/138, 225 R, 227, 318/230, 231, 327

[56] References Cited
UNITED STATES PATENTS

| | | |
|---|---|---|
| 3,187,245 | 6/1965 | Sisk et al........................ 318/225 R |
| 3,512,067 | 5/1970 | Landau............................. 318/227 |
| 3,543,131 | 11/1970 | Johnston........................ 318/227 X |

*Primary Examiner*—Gene Z. Rubinson
*Attorney*—Richard A. Marsen

[57] ABSTRACT

An electric induction motor/control system that provides the desirable high starting torque and torque-speed characteristic of series type direct current motors. The stator of the induction motor is polyphase with two specially interrelated winding sets per phase. The motor windings are supplied with unidirectional current pulses from silicon controlled rectifiers that are programmed to provide the traction mode of operation for the induction motor. The unique relation and interaction between the motor windings hereof and the associated electronic circuitry results in high power factor, good efficiency, and self-clearing SCR commutation action. The preferred motors use a squirrel cage rotor with no commutator, brushes, or slip rings. The complementary stator winding arrangements are not voltage limited, and thereby permit the construction of large power motor systems. Practical motor ratings are from fractional to over 500 horsepower, at speeds ranging from 600 to 40,000 rpm, and higher. The electronic control sections for even the high horsepower motors are operated at low voltage and with few watts. Control circuitry is provided that can operate the motor system with traction output characteristics similar to that of series motors; and with direct speed reversal in such mode. The motor system requires little maintenance, and may be hermetically sealed.

10 Claims, 21 Drawing Figures

United States Patent [19]
Greenwell
[11] 3,753,060
[45] Aug. 14, 1973
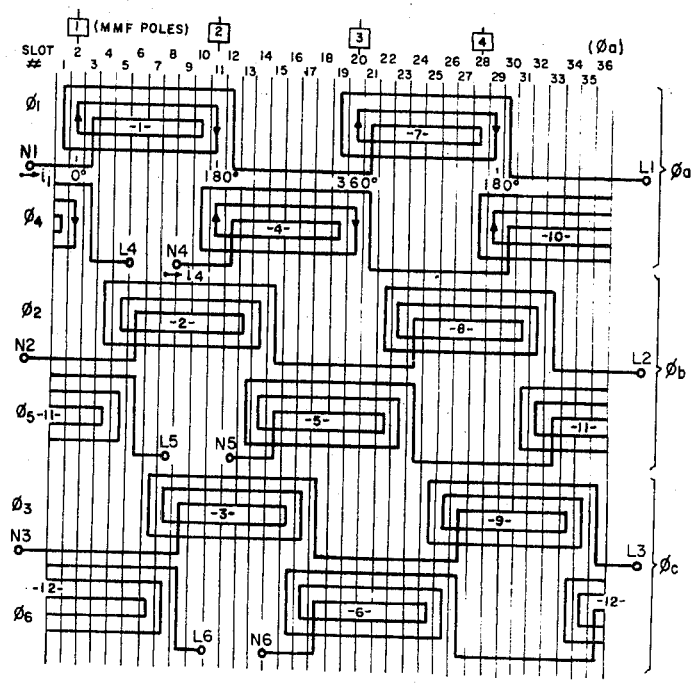

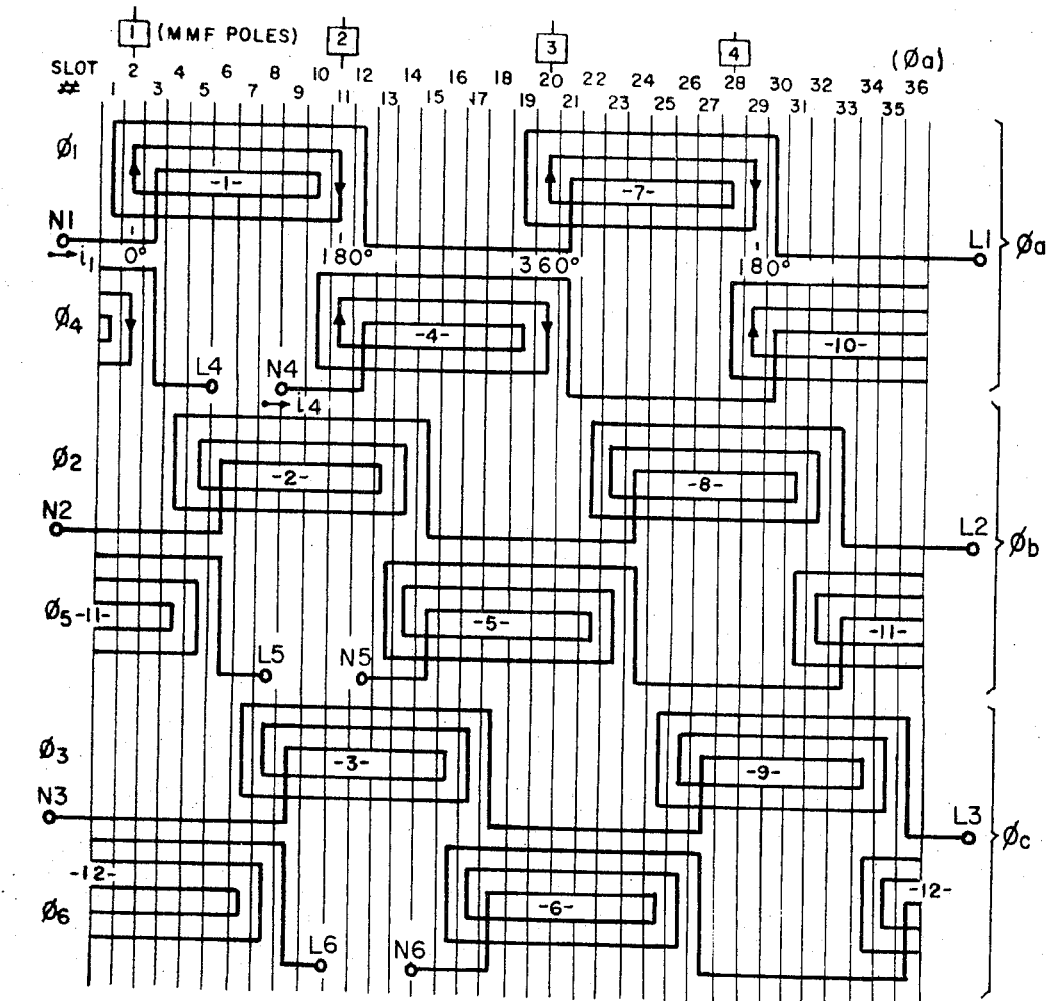
FIG. 2A
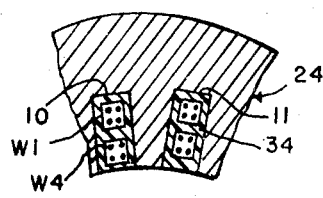
FIG. 2B
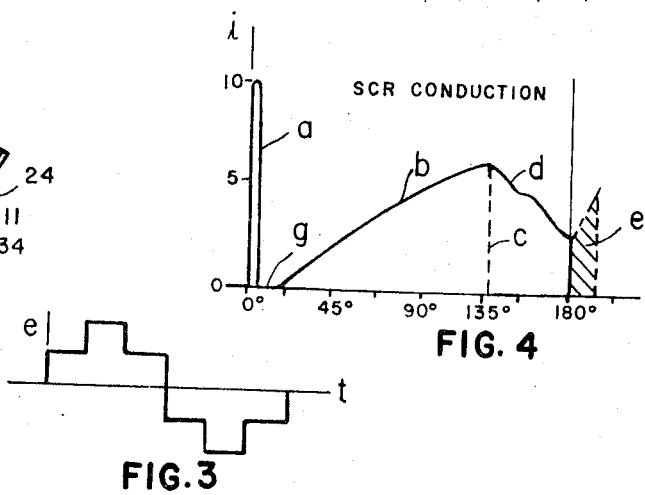
FIG. 3
FIG. 4

INDUCTION MOTOR SYSTEM FOR TRACTION

CROSS-REFERENCE

This patent application is a Division of my copending application Ser. No. 144,897 filed May 19, 1971.

BACKGROUND OF THE INVENTION

Polyphase alternating current induction motors with squirrel cage rotors are the simplest of motor drives. However, in conventional use on commercial power lines their starting torque and speed range are rather limited as compared to direct current motors. On the other hand, direct current motors require commutators and brushes; a source of wear and of sparking. Electronic solid state circuitry has heretofore been combined with induction motors to substantially widen their operating characteristics. Such systems however have been rather unreliable in the field, and involved considerable circuit complexity, reduced efficiency, and lower power factor. Two general types of such motor systems have been evolved. One uses solid state inverters that connect directly to standard ac motors. Another system utilizes complementary winding sets that are closely coupled in each phase, such as bifilar windings, the winding sets being supplied by successive current pulses to operate the motor.

The polyphase motor/inverter system applies square waveform power pulses to conventional polyphase motors. There are several reasons for its comparatively poor performance. These polyphase motors, say three-phase, are wound with less than full coil pitch to control harmonic content. The short pitch results in some stator slots carrying the applied pulse currents in both directions at the same time. This produces less winding effectiveness when operated on the square-wave power. Further, the polyphase stators operate at a higher saturation level on such inverted power, because greater volt-seconds are presented by the square waveform. The RMS value of the current supplied from the inverters is higher than that of fundamental frequency current from a power line. Higher losses thus occurs in the motor windings than when operated directly on sine-wave power. Also, the starting currents are higher. If the inverter were thoroughly filtered to supply sinusoidal power at a particular frequency, it would cost more and be limited as to its motor operating polyphase characteristics.

In the bifilar motor winding system the entire phase to phase voltage must be supported in the stator by the film insulation on the wire. There is no opportunity therein to utilize phase insulation in the stator slots. This severely limits the voltage rating of such motors. Limiting motor voltage rating limits its power output. Further, since there is good magnetic linkage between the complementary windings of each bifilar set, they effectively cancel each other magnetically and push the magnetic flux to near zero. As this happens, the phase current during commutation is limited mainly by the stator winding resistance, which is low. There is thus a sudden current surge during the respective SCR commutation starts of relatively large magnitude current pulses to the respective motor windings. This entails higher ratings for the commutation circuit components. SCR commutation is a problem therein, with miscommutation a serious factor. More than three times the energy is required for commutating their respective SCRs 'off,' than in normal SCR control circuits. Bifilar motor control systems generally require pulse width modulation circuits for stabilization, correspondingly increasing the number of components.

SUMMARY OF THE INVENTION

The polyphase motor/control systems of the present invention overcome the aforesaid limitations of the prior art. Associated winding pairs are arranged for each phase on a full pitch and consequent pole basis. The two windings of each pair are arranged 180° apart magnetically. Minimum coupling is provided between them. Currents are supplied 180° apart electrically to the complementary windings of each phase pair producing a rotating polyphase field. Their SCR commutation requires only normal size components and power, with simpler circuitry. The full pitch windings of the motor hereof carry current in opposing directions in any stator slot, resulting in no loss in winding effectiveness or reduction in magnetic efficiency. The complementary windings use common stator slots with 180° phase separation thereat. The relatively low magnetic coupling between the associated windings of each winding pair per phase hereof is most advantageous in effecting practical SCR commutation with inherent self-clearing for the SCR$^s$ each cycle through energy from the motor. These windings are connected in a manner to perform magnetic inversion, with a zero average value magnetic wave moving around the air gap. Such magnetic wave is similar to that occurring in three-phase squirrel cage motors.

The invention control system, as will be shown hereinafter, is far less susceptible to miscommutation than prior motor/control systems. Also, it is far less vulnerable to damage of its SCR$^s$ and control circuits should miscommutation occur. If miscommutation should take place a motor winding is in series with each SCR, and its inductance limits the maximum current that may be drawn through the SCR$^s$ to approximately only that of the motor stall current. Such nominal overload is a factor readily designed for. The invention pulse and control circuitry is fully coordinated with the motor winding reactions to provide the SCR self-clearing action, and is quite foolproof, as will be set forth. The full pitched consequent pole polyphase winding array of the motors hereof are not voltage limited in the stator slots. Full phase insulation is incorporated. This affords a significant breakthrough for large motor power ratings with the invention motor/control system.

The motor systems hereof are operated off a dc supply. Such supply is derived from a single-phase or a polyphase power source, that is rectified. At rated load and speed the motor/control systems present a power factor of 0.90 to the ac line where it is single-phase, and 0.95 to a three-phase line. Such power factors are better than conventional polyphase motors present directly to the power line. Their overall efficiencies are comparable to three-phase induction motors under similar operating conditions. The motors are readily stopped by the associate control circuitry. The system electronic circuitry is reliable, and less in cost than in comparable motor control systems. Different control circuits effect various predetermined operational modes for the invention motor system. The stator winding array is thoroughly integrated with the electronic pulse and control circuitry to provide the novel, efficient and self-clearing induction motor system hereof. Its wide flexibility in motor power rating, speed range, and operational control establishes an important new branch in motor technology.

BRIEF DESCRIPTION OF THE DRAWINGS

FIG. 2A is a developed diagrammatic representation of the consequent full pitched complementary windings of the exemplary three-phase induction motor represented in FIG. 1.

FIG. 2B is a cross-sectional view illustrative of the winding turns in slots of the exemplary stator per FIG. 2A.

FIG. 3 is a graph showing of the stepped voltage that appears across the respective windings of the stator.

FIG. 4 is a graph showing the typical current flow through the power SCR' of the motor system of FIG. 1.

BASIC MOTOR AND CONTROL CIRCUITRY

Figure 1:
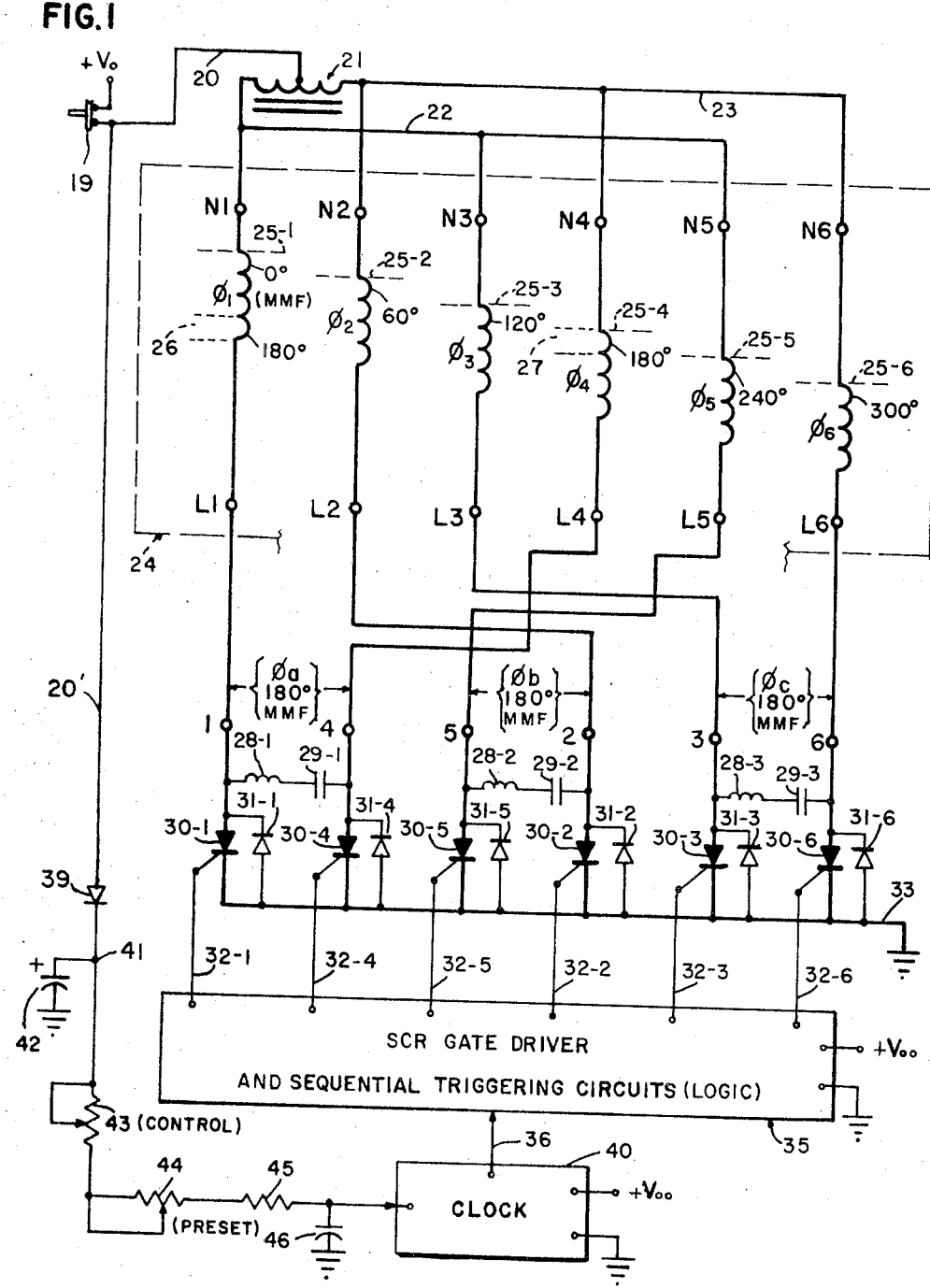
FIG. 1 is a schematic circuit diagram of an exemplary embodiment of a three-phase induction motor and associated electronic pulse and control circuitry.

The polyphase motor system is supplied from a unidirectional power source. Reference is made to schematic circuit FIG. 1 of an exemplary motor/control system. The direct current source voltage $+V_o$ is applied through contactor 19 to lead 20. An interphase transformer 21 is used between the motor windings and direct current lead 20, at its mid-point, to reduce third harmonic effects. The motor windings, as will be set forth, are in complementary sets energized respectively through leads 22 and 23 from the interphase transformer. The six windings of the exemplary three-phase stator, indicated at 24, are grouped through their terminals, as follows: N1, N3 and N5 to lead 22; and N2, N4 and N6 to lead 23. Such dual connection of terminals N1 to N6 requires only two external motor leads therefor. The opposite terminals of the respective stator windings are L1 through L6 which connect directly to corresponding terminals 1 through 6 of the electronic SCR pulse circuitry, as indicated. The stator windings are in six sets $\phi_1$ through $\phi_6$, each termed "half-phase" herein. Their physical construction and arrangement in stator 24 is described in more detail hereinafter in connection with FIGS. 2A and 2B.

The sets $\phi_1$ through $\phi_6$ are wound as complementary pairs, each half-phase pair providing the electrical and magnetic resultant of one full phase for the motor system. The successive unidirectional pulses to the stator windings are of 180° duration electrically, and are sequentially applied in the same direction to all the windings. The windings of each half-phase pair are arranged 180° apart magnetically with respect to each other. The preferred winding array is full pitched and consequent pole for maximum efficiency and for effective foolproof operation of the system. The six windings $\phi_1$ through $\phi_6$ are coordinated to effectively provide the three basic phases $\phi_a$, $\phi_b$, $\phi_c$ for the three-phase induction motor hereof.

Referring to half-phase winding $\phi_1$ as reference for the magnetic sequence of the windings in stator 24, its reference position is indicated as 25-1. The second winding $\phi_2$ at position 25-2 is 60° magnetically apart from the reference winding $\phi_1$. In like manner, the third winding $\phi_3$ at its reference start position 25-3 is an additional 60° apart from the second winding $\phi_2$ magnetically, and therefor 120° apart from reference winding $\phi_1$. The fourth winding $\phi_4$ at its position 25-4 is 60° apart magnetically from its adjacent winding $\phi_3$, and correspondingly 180° apart from reference winding $\phi_1$. Windings $\phi_1$ and $\phi_4$ are used as paired, complementary windings to constitute stator phase $\phi_a$, at 180° MMF separation as indicated at 26,27. The fifth winding $\phi_5$ is 60° apart magnetically from the fourth winding $\phi_4$, and correspondingly 240° MMF apart from reference winding $\phi_1$. It is noted that fifth winding $\phi_5$ is 180° magnetically apart from second winding $\phi_2$, and forms complementary winding pair phase $\phi_b$ for the motor/control system hereof. The sixth winding $\phi_6$ is set 300° magnetically apart from the reference winding $\phi_1$, it being 60° apart from the fifth winding $\phi_5$. Winging $\phi_6$ is 180° apart magnetically from third winding $\phi_3$, and with it forms the third phase set $\phi_c$. An actual winding diagram of the aforesaid six windings in a stator is shown in FIG. 2A.

A power silicon controlled rectifier is connected in series with each winding half-phase $\phi_1$ through $\phi_6$. These SCR' have their respective cathodes at ground line potential (33), with their anodes connecting directly to the respective stator windings. The windings $\phi_1$ through $\phi_6$ in turn connect to the positive dc supply $+V_o$ through interphase transformer 21. The anode of SCR 30-1 connects to stator winding $\phi_1$ through terminals 1 and L1. Similarly, SCR 30-2 connects to phase winding $\phi_2$ through terminals 2 and L2. In like manner SCR' 30-3 through 30-6 are connected in series with respective half-phase windings $\phi_3$ through $\phi_6$ between common ground 33 and the dc buss 20. As will be shown in connection with FIGS. 6A and 6B, the current pulses through the SCR' and the associated half-phase windings are initiated over 180 electrical degree periods for each SCR/winding unit. Also, these are effected at 180° electrical separation and in the same direction in respective complementary SCR phase windings. Such complementary 180° electrically and 180° magnetically separated pairs are the 1 and 4 units that comprise polyphase motor phase $\phi_a$; the 2 and 5 units for phase $\phi_b$; and the 3 and 6 units for phase $\phi_c$. It is noted that phase set $\phi_b$ utilizes half-phase winding $\phi_5$ which is displaced magnetically 240° from the reference phase $\phi_1$, and that phase set $\phi_c$ incorporates half-phase winding $\phi_3$ at 120° relative to reference phase $\phi_1$. Thus 120° separation between the three basic phases of the three-phase motor is provided herein. By reversing the control sequences, as for phase $\phi_b$ and phase $\phi_c$ in the pulse system, we reverse the direction of rotation of the motor per se.

Each SCR 30-1 through 30-6 has a reactive diode 31-1 through 31-6 respectively connected across it. These diodes perform several important functions in the operation of the system, as will be described. A simple commutating circuit is connected between the two SCR' of each complementary phase pair, such circuit comprising an inductor and capacitor in series between the respective SCR anodes. The SCR pair 30-1, 30-4 have commutating inductor 28-1 in series with commutating capacitor 29-1 thereat for phase $\phi_a$. Similarly, inductor 28-2 in series with capacitor 29-2, is used in SCR pair 30-5, 30-2 of basic $\phi_b$. Commutating inductor 28-3 and commutating capacitor 29-3 are connected across the anodes of $\phi_c$ phase SCR' 30-3, 30-6. The interaction of the commutation circuits, the reactive diodes, the SCR' and the respective stator windings are described in detail in connection with FIGS. 4 and 5.

Figure 5:
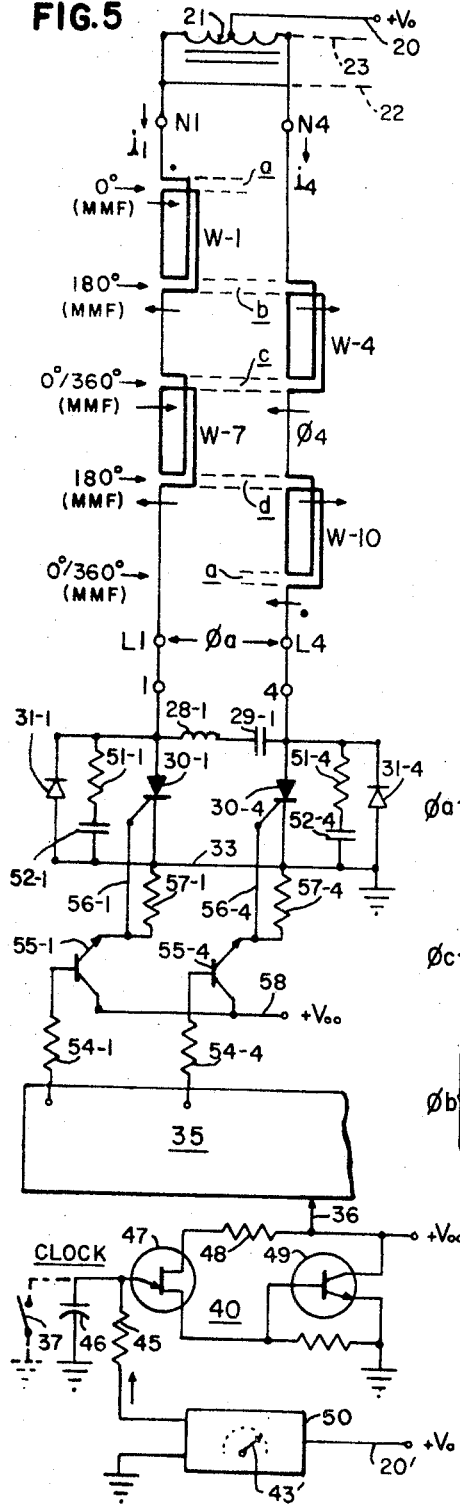
FIG. 5 is an electrical circuit diagram of an integrated phase of the three-phase motor/control system of FIG. 1, used in explanation of the invention system.

An SCR gate driver and sequential triggering circuit (35) is utilized to program the operation of SCR' 30-1 through 30-6 hereof. Each gate of the SCR' connects to SCR gate driver system 35 through respective leads 32-1, through 32-6. The driver and logic circuit array 35 is energized by low unidirectional voltage $+V_{oo}$, preferably regulated to maintain accurate operation. The electronic clock 40 is similarly energized by $+V_{oo}$, and is connected to the logic circuits (35) in a well known manner via lead 36 for their SCR gating control. The exemplary clock is a unijunction transistor (47) as illustrated in FIG. 5. However, other reference clock circuits may instead be used. The gate drive operation of the silicon control rectifiers hereof, in relation to the clock frequency and the SCR gating is described in detail hereinafter in connection with FIGS. 6A and 6B.

Different performance modes for the motor of the invention system are accomplished by the use of different control circuits for operating the basic clock (40). The frequency of the clock (40) determines the rate of sequential gating of the power SCR' in a directly proportional way through conventional logic circuits in unit 35. In the exemplary system of FIG. 1 the unijunction transistor within clock 40 (see FIG. 5) is controlled as follows: The operating dc voltage $+V_o$ is applied to diode 39 through lead 20'. Connection point 41 between diode 39 and electrolytic capacitor 42 extends to clock 40 through a control resistance chain. Exemplary capacitor 42 is rated at 10 microfarads, with one side grounded. Its rating may be in the range of 2 to 30 microfarads. Resistance units 43, 44, 45 are connected in series between point 41 and the unijunction transistor (47) in clock 40 (see FIG. 5).

In the exemplary circuit potentiometer 43 is 35,000 ohms; potentiometer 44 is 50,000 ohms, and resistor 45 is 33,000 ohms. Thus less than 1 watt flows in this resistance chain for the indicated 120 volts for $+V_o$. The frequency of clock 40 is proportional to the applied voltage $+V_o$, and inversely proportional to the total of resistances 43, 44 and 45 in series to the clock. A small capacitor 46 connects between resistor 45 and ground, as 2 microfarads. The clock frequency is inversely proportional to the capacitance of element 46. Capacitor 46 is preset at the factory to remain constant. As indicated, the voltage bias $+V_{oo}$ for the uni-junction clock (40) is regulated to remain substantially constant in the field. Thus, with the buss voltage set at $+V_o$ as at 120 volts, control of the speed of the motor basically depends upon resistance chain 43, 44, 45. In practice, resistor 45 is fixed and potentiometer 44 is held at its factory setting. Potentiometer 44 is a frequency trimming unit. Its setting in conjunction with the value of capacitor 46 and resistor 45 is preset to determine the minimum motor speed. Essentially then the speed of the motor is varied by controlling potentiometer 43. As the resistance setting of control potentiometer 43 is reduced the motor speed is increased. Increasing $+V_o$ also increases motor speed.

Reduction of the net resistance in resistance chain 43, 44, 45 results in increase of the clock frequency, and in turn the rate of pulsing of SCR' 30-1 through 30-6 at a corresponding rate. The rotating magnetic field created by the effective polyphase stator 24 is at a speed that corresponds to the number of magnetic poles and to the frequency applied through the SCR control. The induction rotor within the stator rotates at the corresponding speed as in induction motors. Accordingly, the motor system of FIG. 1 with a fixed $+V_o$ buss essentially has its speed control through potentiometer 43, which in this mode acts similar to a field control in a direct current motor. The potentiometer 44 and resistor 45 are selected to present a resistance in the circuit to the uni-junction transistor, which in conjunction with capacitor 46 presets a safe minimum operating speed for the motor hereof. Adjustment in the factory of potentiometer 44 and of condenser 46 presets the control for particular motors supplied with the control system. The control parameters stated are operated at low voltage and very low power, and are effective for fractional to high horsepower motors.

The motor is started up by maintaining the control potentiometer 43 at its "low" speed position, and closing contactor 19 to apply buss voltage $+V_o$ to the system. The clock 40 is thereby energized to in turn control the sequential triggering and logic circuits (35) for the gate driver action of the SCR' 30-1 through 30-6. The control potentiometer 43 is then moved to effect the operating RPM desired. When the motor is to be shut off, contactor 19 is opened to remove the buss voltage $+V_o$. The presence of electrolytic capacitor 42 prevents the clock frequency from going immediately to zero and thereby stop the motor too fast. Instead, capacitor 42 permits the clock frequency to run down gradually. Due to the prolonged discharge time of capacitor 42, it maintains a continually decreasing voltage to the uni-junction transistor in clock 40. It is an important practical way to stop the motor. It is in a positive control mode all the way, in lowering control frequency directly to operate the motor system correspondingly to slow then stop. There is thus no abrupt or dangerous system action possible due to any direct shut-off or loss of dc source power.

Another way to stop the motor is to gradually slow it down via control potentiometer 43 to a low speed, then remove the $+V_o$ buss by opening contactor 19. Further, the motor may be stopped through eddy current braking by directly shorting-out the action of condenser 42 and the resistance chain. This is done by grounding the unijunction transistor, as by closing switch 37 indicated in FIG. 5. This type of braking occurs since three of the SCR' remain "on" when the commutation is abruptedly withdrawn. The other aforesaid motor stopping ways however are more effective than due to eddy currents flowing in the windings.

BASIC MOTOR WINDING ARRANGEMENT

FIG. 2A is a development diagram of the six half-phase windings $\phi_1$ in the stator (24) of the exemplary induction motor. Each full phase set $\phi_a$, $\phi_b$, $\phi_c$ is comprised of two individual half-phase windings, as previously set forth. The windings of phase $\phi_a$ are arranged to form the four magnetic poles (1), (2), (3), (4) indicated on the top of the diagram. Those of phases $\phi_b$ and $\phi_c$ are arranged to form respective four pole sets. The pole sets of the three effective phases are arrayed at 120° magnetic separation for three-phase operation. The stator has 36 slots as indicated. These slots are arranged in a 360° cylindrical form, as is understood in the art. The rotor operates within the cylindrical stator opening. Half-phase section $\phi_1$ in the exemplary stator is formed as two concentric windings -1- and -7- in series between terminals N1 and L1. Winding -1- extends from slot 1 to 12. Its effective MMF poles (1) and (2), are indicated by the arrows in slots 2 and 11, a spread of nine slots in the 36 slot stator. This is 90° mechanically, which in the four-pole stator is 180° MMF pole separation. Winding -1- is effectively full pitched, even though its turns extend over adjacent slots.

The preferred windings for the stator hereof are full pitch for best operation and efficiency. However, somewhat less than full pitch windings are also within the purview of the present invention. The second winding portion of half-phase $\phi_1$ is concentric winding -7- in electrical series with -1-. Its effective magnetic poles (3) and (4) lie in stator slots 20 and 29, indicated by the arrows therein. It is noted that the magnetic separation of MMF poles (2) and (3) also is 180°, as an effective mechanical separation of 90° exists between slots 11 and 20. Correspondingly, effective MMF pole (4) in slot 29 is equal and opposite to that in slot (2) of winding -1-, and is 180° MMF apart therefrom. The stated magnetic pole separations is indicated in FIG. 2A adjacent to the magnetic pole arrows along the bottom of $\phi_1$ windings. The current direction $i_1$ indicated at terminal N1 is into winding -1- when its SCR (30-1) is a turned "on." The positive dc supply flows into the N1 terminal in such 180° electrical period, as stated in connection with FIG. 1. The windings -1- and -7- are in series, and as illustrated extend over the stator in consequent pole array, i.e. in alternate winding, no-winding array.

The half-phase action of windings $\phi_1$ is due to their being utilized electrically and magnetically for only one-half cycle in the full phase $\phi_a$ operation. Its companion $\phi_4$ half-phase windings -4- and -10- are in electrical conduction and operation during the other half of each 360° electrical cycle of the motor. The $\phi_4$ windings -4- and -10- similarly are full pitched, consequent pole and concentrically wound, being placed in between the blank winding areas of consequent pole array $\phi_1$. However, their turns in the stator slots are in common with the $\phi_1$ set of windings. It is noted that the $\phi_4$ winding set is separated 180° magnetically from its complementary windings -1- and -7- of the $\phi_1$ set. Thus the -4- concentric turns effectively extend between MMF poles (2) and (3) at slots 11 and 20. Also, the second winding -10- of the $\phi_4$ set extends between MMF poles (4) and (1), effectively at slots 29 and 2.

It is further noted that the winding progression and array of the $O\phi_4$ set is the same as the $\phi_1$ set except for their 180° MMF separation, at 90° mechanically hereof. Also, the 180° away current pulse $i_4$ into terminal N4 provides the MMF effective pole directions as indicated by the heavy arrows in windings -4- and -10-. Their magnetic poles are in opposite relationship to the adjacent MMF pole directions of the $\phi_1$, winding set -1- and -7-. Since the unidirectional current pulses into the $\phi_4$ windings are 180° electrically behind the current pulses into the $\phi_1$ windings, and flow into the windings in the same direction, the effective magnetic pole array presented by the winding pair $\phi_1$ and $\phi_4$ provides the effective full phase $\phi_a$ action for the motor stator, as will now be understood by those skilled in the art.

Significantly, the consequent pole and interposed relation of the companion windings of each full phase, as described, minimizes the mutual induction between complementary windings. Their current pulses are 180° apart electrically, and are directed to flow in opposite directions in their respective turns in common slots, as denoted in FIG. 2A by the resultant MMF arrows. Such arrangement further reduces magnetic induction between the companion windings of each phase set. The winding turns at their end area, namely outside of the respective slots, are preferably uncoupled to further minimize said mutual induction.

System operation advantages accrue from the exemplary winding array with minimum mutual inductance between the windings of complementary sets $\phi_1$ and $\phi_4$ of phase $\phi_a$, and likewise of phases $\phi_b$ and $\phi_c$. This is important in effecting the cyclic self-clearing SCR commutation function herein. The inter-relationship between the energy of the rotating motor, the individual stator windings hereof, and the SCR pulse circuitry provides positive SCR self-clearing, as described hereinafter in connection with FIGS. 4 and 5 More effective MMF results by making the windings as full pitched as feasible, improving motor efficiency. The concentrically wound stator windings as illustrated may be replaced by lapp windings in practicing the invention motor/control. Making the mutual induction between complementary windings of each phase relatively low also minimizes SCR commutation circuitry and power, as well as effecting the self-clearing and overall foolproof SCR action by the present invention. This is in important contra-distinction over the prior art. Bilfilar windings of necessity have close coupling of companion winding pairs which maximizes their mutual induction, and create deleterious strong inductions to the SCR circuits.

The effective phase $\phi_b$ of the stator is provided by the $\phi_2$ and $\phi_5$ winding sets. As indicated in FIG. 1 at 25-5 the half-phase $\phi_5$ winding set -5- and -11- is 240 magnetic degrees apart from that of reference windings $\phi_1$. The central left turn in winding -5- is in slot 14 which is 12 slots beyond slot 2 for the corresponding turn in the -1- reference winding hereof. This places the corresponding first magnetic pole for the -5- winding at 240° magnetically apart from the $\phi_1$ winding -1- and its pole (1). The $\phi_5$ winding -11- is correspondingly 240° apart from the $\phi_1$ winding -7-. The companion complementary windings -2- and -8- of half-phase set $\phi_2$ is 180° magnetically apart from the $\phi_5$ windings. These then form the complementary effective winding set for full phase $\phi_b$ of the stator, in the same manner as hereinabove described for $\phi_a$. In like manner the $\phi_c$ phase is made up of the $\phi_3$ windings -3- and -9- that are 120° magnetically apart from the first pole (1) of the $\phi_1$ set. The windings of $\phi_6$ are -6- and -12- which lie 180° magnetically apart from the $\phi_3$ winding set.

It is noted that when in its conducting mode each half-phase winding set $\phi_1$ through $\phi_6$ generates four MMF poles in successive alternate direction, in the manner indicated by the arrows for sets $\phi_1$ and $\phi_4$ in FIG. 2A. Thus each such half-phase winding directly provides four MMF poles each 180° apart magnetically about the stator (24). Should three-phase ac power be applied to terminals L1, L3 and L5, with N1, N3 and N5 interconnected as a neutral point, a full rotating magnetic field would be generated in the stator, and with its rotor therein would operate as an induction motor. If instead, half-phase windings $\phi_2$, $\phi_4$ and $\phi_6$ were connected in a similar manner, the motor would operate likewise. However, in the invention system, each winding set $\phi_1$ through $\phi_6$ is energized in successive half-cycles as aforesaid, with the complementary half-phases operated alternately to provide the resultant full phase motor action as phases $\phi_a$, $\phi_b$, $\phi_c$.

The winding array for the stator per FIG. 2A utilizes all 36 slots to form an effective compact winding pattern. The motor has four effective poles for each full effective phase $\phi_a$, $\phi_b$, and $\phi_c$. The respective pole sets are at 120° and 240° magnetically apart from the reference set $\phi_1$ and $\phi_4$ for the three-phase motor operation. Stators with more or less poles, in multiples of two, are similarly wound as will now be understood by those skilled in the art. Also, motors with other than three phases may likewise be constructed following the principles set out herein. More than single phase is needed to make the induction motor systems hereof self-starting. The stator is preferably constructed with an integral number of slots per pole per phase to provide for full pitched windings. Where otherwise feasible, more than fewer slots are desirable for improved winding distribution factor.

FIG. 2B is a cross-section of a portion of the stator (24) of the motor hereof. The stator is of quality steel laminations. The illustrated portion contains the slots, say 10 and 11, of the array of FIG. 2A. Within these slots are turns of the windings -1- and -4-, indicated as W-1 and W-4. A wide range of turns may be used for the windings. For example, such windings each may range from five to seventy-five turns per slot, depending upon the size, power, and operating characteristics of the desired motor. Their wire diameter corresponds to the current demands in the motor operation, as is understood in the art. A significant advantage of the stator winding array of the present invention is that the turns of the complementary windings of each phase set $\phi_a$, $\phi_b$ and $\phi_c$ can be fully phase insulated in their common slots. This is illustrated in FIG. 2B by insulation 34 around the grouped winding turns W-1 and W-4 in common stator slots (10,11). Such full phase insulation means that motors rated for operation at 500 volts, and higher, can be practically constructed. The motors of the present invention are not voltage limited at their stator windings, nor otherwise mechanically limited, and horsepower ratings to 500 horsepower, and higher, maybe built and operated hereof.

OPERATION OF THE BASIC MOTOR/CONTROL SYSTEM

FIG. 5 is a schematic electrical diagram of full phase $\phi_a$ of the motor/control system in accordance with FIG. 1. The respective half-phase winding sets $\phi_1$ and $\phi_4$ are illustrated in their physical relationship corresponding to stator FIG. 2A. Half-phase $\phi_1$ windings W-1 and W-7 are connected in series between line 22 at interphase transformer 21 and the anode of its SCR 30-1. Similarly, half-phase $\phi_4$ winding set W-4 and W-10 in series is connected between line 23 and SCR 30-4. Their respective MMF poles are at 180° separation as marked by arrows at the windings at successive positions a, b, c, and d. The $\phi_1$ and $\phi_4$ windings are displaced by one pole set, namely by 180° MMF.

If interphase transformer 21 were not used, source voltage $+V_o$ would be applied to all the N terminals of the six half-phase windings. Such motor/control system would still be effective, but at reduced efficiency. The reason is that square wave voltage pulses would be applied to the half-phase windings, with triplicate harmonics circulating via the reactive diodes (31) to phases accepting power. This would increase the internal $I^2R$ and diode losses. The interphase transformer 21 eliminates the third and related higher harmonics from the half-phase windings $\phi_1$ to $\phi_6$ by providing the main potential in six-step waveform across the respective half-phase winding sets. This more advantageous stepped waveform is illustrated in FIG. 3.

Transformer 21 minimizes all zero sequence harmonics including the triplicate harmonics, resulting in closer approximation of the fundamental or base frequency applied to the stator windings. These windings function in concert as an autotransformer, and provide a voltage magnitude, from the center tap of transformer 21 across the half-phase windings to their respective L terminal at the SCR$^s$, of twice $+V_o$. The actual magnitude of the six-step waveform across these windings per se, between their N and L terminals, is somewhat less. Transformer 21 is a balancing reactor which allows the two common neutral points, represented by respective leads 22 and 23 of the connected stator windings (at N) to float.

The reactive diodes (31) are in shunt across the SCR current switches (30). These diodes prevent unusually high voltages from occurring because of sudden current turn off by the commutation. Such voltages could be produced as the result of high L $di/dt$. The reactive current flow generated between windings $\phi_1$ and $\phi_4$ for phase $\phi_a$ due to switch-off of SCR 30-1 actually takes place through the companion reactive diode 31-4, eliminating such problem in the circuit; and similarly for $\phi_b$ and $\phi_c$.

In order that the SCR$^s$ promptly turn off in accordance with its programmed pulsing, conventional commutation components are used, namely inductor 28-1 and capacitor 29-1 between the complementary 1 and 4 circuits. These serve to back bias a conducting SCR for a finite duration of the order of several microseconds. Such period of back biasing results from the natural ring frequency of the selected L-C commutating components 28-1, 29-1, as is well known. The size of capacitor 29-1 is dependent upon the magnitude of the current flowing in say the 30-1 SCR prior to and during the commutation. The magnitude of such current in turn depends on the per phase impedances of the motor winding sets $\phi_1$, $\phi_2$ etc, and the amount of magnetic coupling through the stator between complementary half-phase windings, as $\phi_1$ and $\phi_4$ in the FIG. 5 example.

When a motor has its stator windings quite closely coupled, as in bifilar motors, their inductances substantially cancel out. In such motor system the magnitude of the current through the SCR' would be relatively very high, as it would be limited substantially only by the low resistances of the stator windings. This makes SCR commutation difficult and unreliable as expressed hereinabove. However, the windings of the respective half-phases $\phi_1$ and $\phi_4$ for full phase $\phi_a$ are in consequent pole array and intentionally arranged for minimum mutual inductance therebetween. This allows the separate half-phase windings to maintain their separate inductances and rotor linkages. There results relatively fast commutation action of their SCR' 30-1, 30-4. The SCR currents, power rating, and associate circuitry are thereby substantially reduced. Across each SCR is resistance-capacitance network: 51-1, 52-1 across SCR 30-1; 51-4, 52-4 across SCR 30-4; etc. These R-C circuits are snubbers, used to bypass spurious harmonic frequencies and stabilize the SCR control circuitry.

The SCR gate driver circuit (35) contain the sequential triggering logic circuits for programming the SCR conduction periods in known manner. Individual control leads extend from circuit 35 through respective series resistors as 54-1 and 54-4 shown in FIG. 5. A layer of gate drive amplifiers 55-1, 55-4 etc is used. These may be considered buffer amplifiers and/or amplifiers for gate drives of higher power SCR'. The transistors 55-1, 55-4 are biased by regulated constant voltage $+V_{oo}$ at line 58. The exemplary magnitude of $+V_{oo}$ is 5.0 volts, also used for the uni-junction transistor clock circuit (40). The coupling resistors (54) connect to the base of the gate drive transistors (55), which in turn connect to the gate electrodes of the associated SCR' (30) through leads 56-1, 56-4. Loading resistors 57-1 and 57-4 are conventionally connected in this amplifier circuit.

SCR circuits are subject to occassional turn-on at wrong times. Reasons are varied, such as high line transients, an improper logic signal, etc. When this happens the commutating capacitor (29) may not be charged, and commutation cannot occur in the normal manner. If for example, SCR 30-1 and 30-4 were thus "on" at the same time, they would each be in series conduction with their respective half-phase windings $\phi_1$ and $\phi_4$ at the same time. As these windings have low mutual inductance due to the manner of their winding and array as hereinabove set forth, the current through their respective SCR' becomes only nominally high. In fact, the total current through the windings and the SCR' during such micommutation does not exceed the stall torque current for the motor. The rating of the SCR' used are selected accordingly, a practical benefit. In control circuits, as inverters, where companion SCR' are connected line-to-line to the dc source, miscommutation would result in permanent damage to the SCR'. Often rather complex protective circuits are provided therefor.

In the motor system hereof the low order of mutual coupling between complementary half-phase windings allows normal commutation in one phase to force commutate in the adjacent phase. Also, the reactive energy from the operating motor windings is discharged cyclically during each revolution to provide strong back bias for all the SCR', as will now be set forth. Referring to FIGS. 1 and 5, let us assume that the SCR' of sections 1, 5 and 3 are turned "on" and conducting in normal manner, in normal phase relation. Then in sequence SCR 30-4 of section 4 is turned "on." This normally would cause its companion SCR 30-1 to be commutated to "off." However, if 30-1 does not commutate to "off" it is in a latched condition, termed miscommutation. When such condition occurs the commutating capacitor 29-1 between sections 1 and 4 has no stored energy, and further normal commutation thereby in the companion sections 1 and 4 cannot occur.

The logic circuit (35) driving the gates of SCR' 30-1 through 30-6 is ignorant of this miscommutation, and proceeds to gate the section 2 SCR 30-2 to "on." As SCR 30-2 begins to conduct, the forced commutation turns "off" companion SCR 30-5, and allows the forward current in half-phase winding $\phi_2$ to increase after such commutation between SCR 30-5 and 30-2. However, both the forward current starts to rise in SCR 30-2, stored energy trapped in half-phase winding $\phi_5$ flows through reactive diode 31-2. Since sections 1 and 4 are short circuited across their SCR' 30-1, 30-4 due to the stated miscommutation, the reactance of all the other windings linking the $\phi_1$ and $\phi_4$ windings through the stator is greatly reduced from the normal state. During such substantially reduced reactance state in the motor, the reactive current that flows is relatively high in amplitude and of short duration, of the order of 200 milliseconds. The net effect of this strong reactive current flow is to back bias all the SCR' in the motor circuit, and return energy to the dc source $+V_o$. As this energy is being returned to the source, all the power SCR' 30-1, 30-4 etc are presented with a relatively long turn-off time. In effect energy stored in the operating motor, magnetically and mechanically is utilized for this back biasing of all the SCR' in the next full cycle. During this turn-off or back biasing period all the conducting SCR' stop their conduction and go into a forward blocking voltage condition. After said reactive current flow, and the forward voltage is reapplied, the miscommutated or latched "on" SCR, namely 30-4 in this example, does not return to the conducting state since by then the sequential logic gate signal therefor is at zero.

The sequence of events herein described provides automatic self-clearing of the SCR' before the following cyclic period of any latched on pair is over. It is noted that any one section including an SCR (30) and its half-phase winding set ($\phi$) is in effective series relation with any other section. The said reactive energy enters the "on" sections in the reverse direction which is just right for the self-clearing of the SCR' to "off" that results. Thus, miscommutation directly brings on the strong reactive current flow and promptly clears it away. Also, there is a difference between such mode of SCR clearing and the normal mode of commutation as to the relative magnitude of the current flowing. The important factor herein is that the six half-phase windings in the stator arrayed for effective three-phase operation has all the windings interlinked at the fundamental frequency across the stator with no winding independent of the other. Also, the direction of the strong reactive inductions into the arrayed half-phase windings $\phi_1$ to $\phi_6$ hereof is such as to induce high voltages into the conducting SCR sections that safely and directly back bias them to "off." For this reason, when looking at the SCR forward voltages there is a negative going portion during each period of conduction for each phase, which conducts reactive energy during a given cycle, resulting in the SCR cyclic conduction per FIG. 4 with a gap at $g$. The first turn-off possibility is the normal programmed impulsed commutation initiated by the SCR gate driver (35) with the commutation components 28,29 across companion SCR pairs. The second turn-off possibility is presented when the usual reactive energy hereof flows in that phase pair, indicated at $e$ in FIG. 4. This does not occur if they are latched up. Two further turn-off possibilities for that particular condition occurs when the other associated phase pairs are commutated. A latched on pair is cleared by the strong reactive surge generated by the other windings as herein set forth. Overall, the combined commutation factors inherent in and compositely functioning in the motor/control system hereof provides practical, efficient and substantially foolproof operation including its internal self-clearing commutation.

Reference is made to FIG. 4 which illustrates a typical SCR (30) conduction pattern during its normal 180° electrical "on" period in the motor/control system of the present invention. The initial commutating gated pulse to the SCR programmed from the logic circuits (35) results in the sharp narrow pulse $a$. The exemplary pulse $a$ peaks near 10 amperes and has about a 2° duration in the 180° electrical conduction or "on" period for the particular SCR. The normal operating cyclic reactive energy discharge by the motor windings generates a sufficiently strong back-bias energy into the SCR section that is set for conduction through its half-phase windings ($\phi$) so as to directly create the conduction gap $g$. Such gap $g$ extends over the range of 15° to 20° in the period. The SCR conduction thereupon resumes and rises slowly until about the 140° point indicated at $c$. It peaks here at about 6 amperes, than droops off along $d$ to about the 3 ampere level, when it is extinguished by normal commutation at the 180° period end.

The triangular shaped conduction curve $b$, $d$ is the combination of the real current components in the associate winding $\phi$ while other half-phases are turned "on." Any one SCR section is not independent, as the windings of the stator (24) are all linked magnetically across the stator structure, and the sharing of the load by the SCR' sections that are "on." In normal operation three SCR sections are "on" at any one time. Importantly, should any one SCR not turn "off" but instead latch "on" as indicated by continued conduction at $e$ beyond the 180°, it is normally herein directly extinguished in time by the 190° point. The reason is that the same periodic back biasing effect in the system hereof that produces the SCR conduction gap $g$ operates to back bias the latched "on" phase at $e$. Should this not be thus effected in some instance, the overall strong reactive energy back surge described overcomes it and is thereby self-cleared.

Figure 6A:
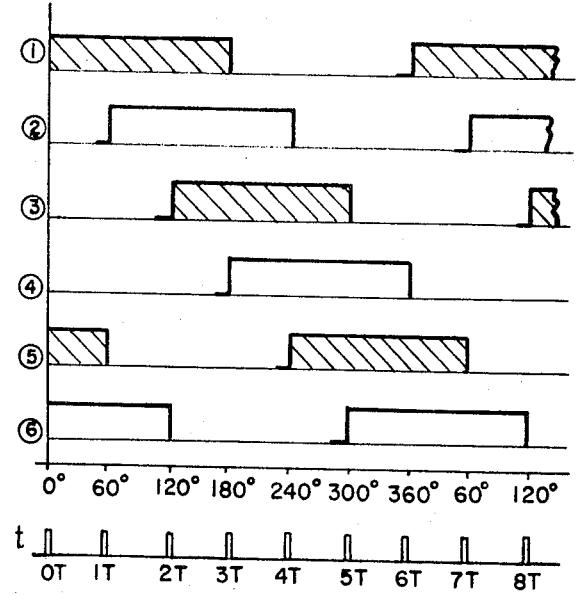
FIGS. 6A and 6B illustrate the SCR triggering-on pattern of the motor/control system of FIGS. 1 and 4.
Figure 6B:
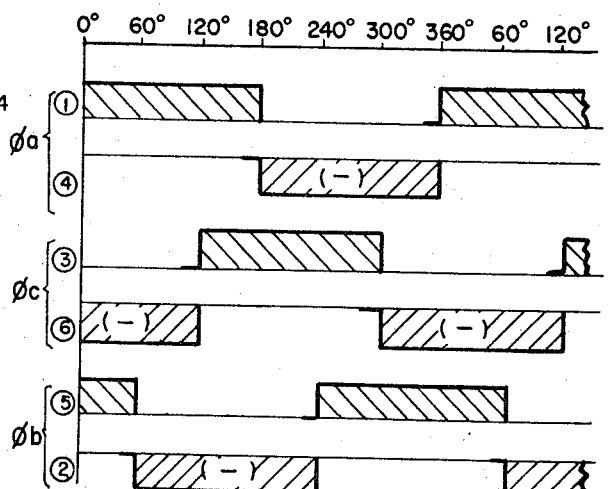

FIGS. 6A and 6B illustrate the logical gating action on the successive SCR' 30-1 to 30-6 initiated under the control of the logic circuitry 35. It is understood that the basic or fundamental frequency that effect SCR periods is derived from the frequency of the pulses that are generated by clock 40. The clock frequency in turn is determined by control circuitry as 50, in the manner heretofore described. At a given clock setting the gating pulses 1T, 2T, etc are successively generated and impressed in the time sequence, at 60° spacing herein, to the SCR gates. In FIG. 6A the regular pattern of the conduction periods for the SCR sections 1 through 6 are outlined. They are successively started at 60° intervals in time, reckoned over 360° of the fundamental frequency. Their duration is 180°, when the SCR commutation occurs due to the activation of the complementary SCR section. The companion SCR sections are shown grouped together in FIG. 6B; 1 and 4, 3 and 6, 5 and 2 respectively forming full phases $\phi_a$, $\phi_c$, $\phi_b$ as aforesaid. As the SCR sections 4, 6 and 2 are conducting at 180° being their associated sections 1, 3 and 5 (per FIG. 6A), they are indicated in their equivalent negative (-) direction in FIG. 6B. It is to be understood that FIGS. 6A and 6B are explanatory timing pattern diagrams and that the actual SCR conduction flow corresponds to FIG. 4.

The actual duration of each conduction period (3T) is directly proportional to the actual frequency of clock 40. The clock frequency is derived by the voltage and impedance applied to the emitter of its uni-junction transistor 47. An emitter follower amplifier 49 is optionally used for transistor 47, with output at lead 36 and fixed biasing of both through $+V_{oo}$ and coupling resistor 48. The comparable uni-junction transistor clock circuits of FIGS. 12 and 16 do not utilize an amplifier. Further, equivalent other types of clock circuits may be used. These control the logic circuits which include flip-flop circuits of known configuration. As described in connection with FIG. 1, resistor 45 is fixed and capacitor 46 is preset. The control unit 50 contains potentiometers (43,44) and connects to the source voltage $+V_o$ via lead 20'. Control knob 43' operates a contained speed control potentiometer (43) for the motor operational purposes set forth hereinabove. The motor operation with such control section will thereupon depend upon the setting of 43' and the magnitude of $+V_o$ applied.

Figure 7:
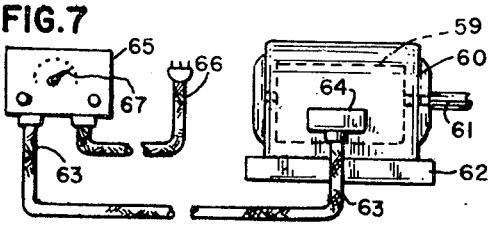
FIG. 7 is an elevational view of an induction motor and its control unit in accordance with the present invention.

FIG. 7 is an elevational view of a motor/control in accordance with the present invention. The motor 60 contains the squirrel cage type of rotor indicated at 59 rotatably mounted with output shaft 61. The stator contains the six half-phase winding arrays ($\phi$) as described in connection with FIGS. 2A and 2B. The motor housing is supported on base 62. The six stator windings hereof are terminated in eight-wire cable 63 at connection box 64. The control circuitry including the six SCR' (30), the reactive diodes (31), logic circuits (35), clock (40) etc are incorporated in panel box 65, as are the rectifier and dc output voltage controller. Cable 66 is to the three-phase power line. The control knob 67 corresponds to 43' in FIG. 5 to directly control the operating speed of the rotor 59, as will now be understood by those skilled in the art. The rotor is preferably a squirrel cage type. However, reluctance type, or wound rotor induction motors may instead be used if indicated.

MOTOR OUTPUT CHARACTERISTICS: IN GENERAL

Figure 8:
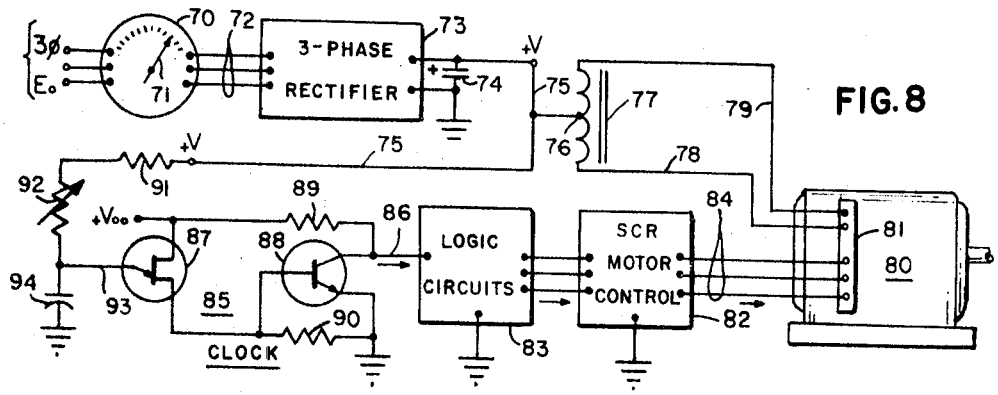
FIG. 8 is an overall circuit diagram of a motor/control system hereof, with one form of variable dc voltage supply.

FIG. 8 is a schematic electrical diagram of the overall motor/control system, in one embodiment thereof. In this system, the motor is operated by varying the input dc motor voltage (+V), as well as the input potential to the emitter of the uni-junction transistor (87) of the clock circuit (85). A three-phase variable autotransformer, variac 70, is interposed between a three-phase power line at effective voltage $E_o$ and three-phase rectifier 73. The setting of variac 70 is externally controlled through knob 71. Its three-phase output leads 72 are at the same frequency as the power line, impressing balanced three-phase variable voltage upon rectifier 73. The dc output of rectifier 73 is shunted by filtering condenser 74. Where required, a filter choke coil (not shown) is inserted in series in its output. The magnitude of rectified dc voltage +V at output lead 75 corresponds to the setting of arm 71 of variac 70.

Lead 75 is connected to center tap 76 of interphase transformer 77, the outer terminals of which connect to the two groups of stator winding terminals (N) in motor 80 via leads 78, 79. The stator of motor 80 contains an array of half-phase winding sets corresponding to those described in connection with FIG. 2A hereinabove. With two complementary half-phase winding sets per basic phase, six are used for the three-phase hereof. The SCR circuits in unit 82 for the motor control are directly connected to the half-phase windings by the schematically indicated cable 84. In turn, the logic circuits 83 are similarly coupled to unit 82 for control of the SCR and electronic components, in the manner already described in connection with FIGS. 1 and 5. The clock 85 contains uni-junction transistor 87 coupled to follower amplifier 88, and biased by the low level constant dc voltage $+V_{oo}$. Resistors 89 and 90 complete the amplifier circuit, the output of which is connected to the logic circuits 83 by lead 86.

The control section that determines the frequency of uni-junction transistor 87 comprises fixed resistor 91, variable resistor 92, and preset capacitor 94. The dc system voltage +V is applied via lead 75 to this section at resistor 91. Lead 93 couples this series control section to the emitter of unijunction transistor 87, in the manner of the corresponding sections in FIGS. 1 and 5. Variation of the resistance setting of potentiometer 92 controls the frequency of clock 85: a higher resistance setting resulting in lower frequency; a lower resistance setting, in higher frequency, as set forth hereinabove. Further, the uni-junction frequency herein is slaved to the voltage +V as set by variac 70 so that at any given position of potentiometer 92 the effective dc value (+V) impressed upon this control section changes the frequency of the uni-junction transistor 87 correspondingly as well. The clock 85 frequency is thus determined by the voltage setting per 71 as well as the resistance setting at 92. The range of frequency control herein, as provided by potentiometer 92 is often narrow, as a vernier behind 71. For a particular setting of potentiometer 92 the clock frequency (85) is thereby slaved to the magnitude of the voltage (+V) supplied to the motor (80). A higher voltage setting (+V) results in higher power and torque for motor 80, as well as higher base frequency operation of the motor via SCR unit 82, in turn controlled by the logic 83 and clock 85 units. Conversely, a lower voltage setting (+V) produces lower effective torque and power output by the motor, which is thus also operated at a lower base frequency via clock 85. The application of such coordinated control (71, 92) on the motor 80 hereof is now described in connection with FIG. 9.

Figure 9:
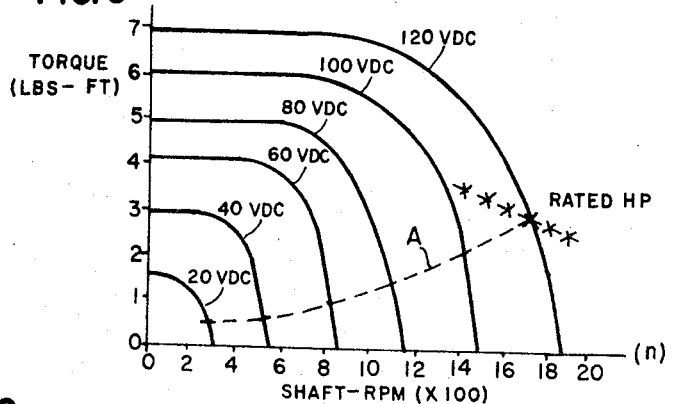
FIG. 9 is a family of operational motor torque/speed curves, as derived with the control system of FIG. 8.

The motor 80 of the system FIG. 8 typically produces the family of curves illustrated in FIG. 9. Basically, the torque axis is a function of the input dc buss voltage (+V) and the frequency of the clock (85). Its horizontal speed axis ($n$) is a function of the clock frequency only. By the arrangement hereof that keeps the clock frequency proportional to change in input dc buss voltage, there results the family of torque-speed curves of FIG. 9. With potentiometer 82 present, the different +V voltages applied result in the characteristic spaced curves, herein at 20 volts apart. The top 120V curve is highest of this group, and produces the highest torque, namely 7 pounds-feet by a one horsepower motor. The rated HP output occurs at about 1700 RPM, as indicated. By varying the motor speed via potentiometer 92, with +V preset at 120 volts, the rated HP output occurs over the narrow range along the broken lines indicated, namely from 1400 to 1900 RPM. Rated horsepower prevails in this continuous range of speeds, at the downward bend of the torque-speed curve. This practical operating range of speeds for the 120V dc characteristic is controlled in vernier fashion over the rated indicated horsepower range, through settings on potentiometer 92, as will now be understood.

Corresponding operating ranges for any voltage setting +V are set for continuous motor operation. Operation at speeds other than in such range is limited to relatively short periods to prevent excessive heating in the motor. Continuous operation at somewhat higher speeds is feasible. However, due to the downward slope of the torque-speed curve, the operating speed range is limited for a given voltage +V, as stated. The family of curves of FIG. 9 is developed with operational dc buss voltages as indicated, in 20 volt steps down to 20 volts dc. It is noted that lower nominal torque levels occur at corresponding lower operating dc voltages +V. Each of such curves nevertheless has similar torque-speed operational characteristics, at correspondingly lower horsepower potential as buss voltage +V is lower. The dashed lined curve A in FIG. 9 is the operating locus for varying buss voltage +V, with corresponding clock (85) frequency slaved thereto (per FIG. 8). The curve A is generated with potentiometer 92 setting held fixed. The variac 70 is adjusted for voltage settings, through arm 71. The resultant A curve shows load output and torque increasing with motor speed ($n$), both with voltage +V. The motor may operate continuously at any point under the A curve over the entire speed range.

Figure 10:
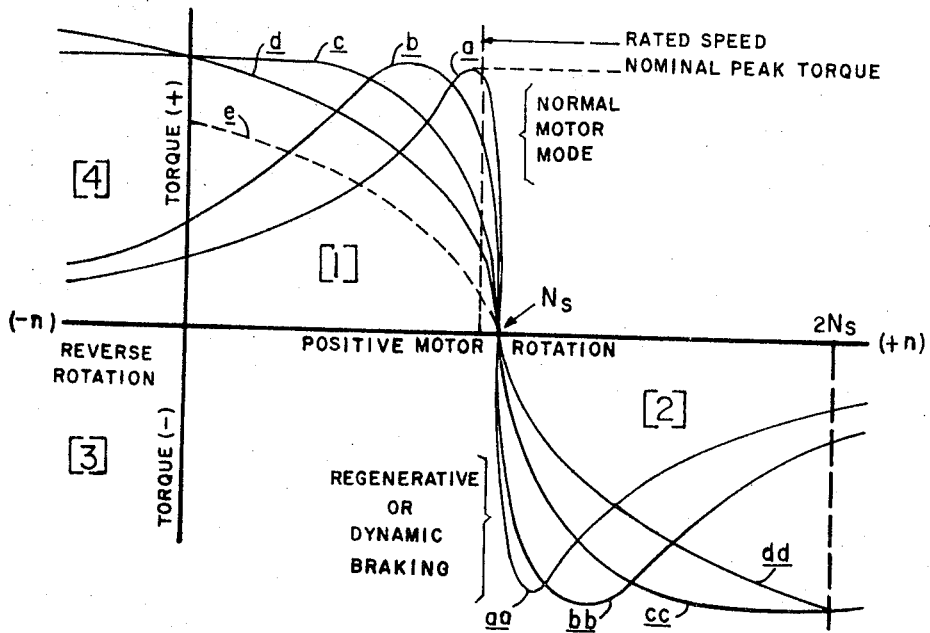
FIG. 10 is a family of curves of typical motor sustems hereof, over wide operational ranges of torque and speed.

The overall system performance of the motor/control hereof is a function of the electromagnetic design of the motor in a manner in which its speed is regulated by the control section, as set forth. Electromagnetic design of the motor determines the shape of the fundamental torque-speed curve for a particular motor. FIG. 10 illustrates the characteristic motor torque-speed curves of various motors, and at several quadrants of operation. The first quadrant contains the family of five curves $a$, $b$, $c$, $d$ and $e$, all in positive torque positive speed relation. In analyzing the quadrant (1) torque-speed characteristic, the motor system hereof may be compared to a conventional three-phase induction motor insofar as its inherent torque-speed curve is concerned for a particular voltage and particular frequency applied. The different curves a through e show the effect of differing resistance of the induction motors, in conventional as well as in motor systems hereof. The induction type motor with squirrel cage rotor has a fixed effective resistance value set by its design and construction. Conventional ac induction motors for operation off polyphase power lines, are often designed to operate per curve b since this represents a compromise between good starting torque and low rotor operating losses. Curve a for example represents a motor with lower starting torque but also with lower rotor losses at full load. Sustained operation of conventional constant-voltage constant-frequency polyphase motor is feasible with slip, thus below but near what would be synchronous speed. When such motors try speed of operation at substantially less, the motor overheats and becomes damaged.

The brushless dc operated motors of the present invention have the same inherent torque-speed curves as a through e of FIG. 10 but with a large advantage over conventional motors off a power line. Both the speed and the torque of the FIG. 10 curves for the motors hereof are widely adjustable instead of being fixed (including at negative values). As hereinabove set forth, the torque is a function of the input dc buss voltage (+V) and the accompanying slaved clock frequency (85); the speed ($n$), a direct function of the clock frequency alone. By maintaining the clock frequency proportional to the input dc voltage (+V) per FIG. 8, the torque-speed curves of FIG. 9 result, as hereinabove described. The high starting torque curves of FIG. 9 correspond to curve c of FIG. 10. The other curves in quadrant (1) have substantially lower starting torques, or torques that are unsustained. Utilizing the control sequence per the control section of FIG. 8, the first quadrant forward motoring curve is represented by the family of curves for FIG. 9. The particular curve of course depends on the rating of the motor and the level of the operating dc buss voltage (+V) applied, as will now be understood by those skilled in the art. In FIG. 10 nominal peak torque levels, and rated or operating speed are indicated.

Should the positive motor rotational exceed the nominal synchronous speed ($N_s$) value, it would be operating in the second quadrant (2). The operation of the motor would be in the regenerative or dynamic braking mode. Such over speed produces negative torque as quadrant (2) presents, and involves speeds up to twice the inherent synchronous speed $N_s$. Such overshooting of the motor speed generates negative torque by the motor. The third quadrant (3) with both reverse rotation ($-n$), and negative torque, is the equivalent of reverse motoring or generator action by the motor system. This mode of operation returns dc energy to the source 73. In the fourth quadrant, with reverse rotation ($-n$) and positive torque, we have the plugging operational mode. The motor/control systems hereof are operable in all of the four torque-speed quadrants indicated in FIG. 10 with controls and currents capability in reverse. Any particular operating motor curve utilized in these quadrants, insofar as their characteristic curve shape and operation is concerned, depends upon the relative rotor resistance of the motor.

The flexibility of the motor system hereof as to performance and operational modes is wide and varied. Infinitely variable speed control is practical in course or vernier action, as set forth. The operation of the motors is relatively foolproof, with self-clearing commutating action. Rotating fields are generated in the polyphase manner in the direction that determines the rotor rotation in the (1) quadrant. Reversal of the motor is readily accomplished by the low power low voltage control section by simply reversing the logic action on the relative phases $\phi_a$, $\phi_b$ and $\phi_c$. Other important torque-speed operating modes than are described for FIGS. 8 to 10 are practical and feasible, together with their comparable action in the four torque-speed quadrants. In all modes it is preferred to utilize the high starting torque that the invention motors inherently have. Also, the have significantly high stall torques without damaging the electronic circuits, as aforesaid. In practice, the overall cost at greater than 2 HP ratings has been found less than that of comparable dc motors. Besides, the motor systems hereof are explosion proof, and can be readily hermetically sealed for indicated installations. Their size and wieght per output horsepower, and overall system efficiency are comparable to three-phase induction motors at the same rated operating load and speed. The operating speeds hereof are readily controllable and variable, and unrelated to the ac line frequency which is rectified. Design speeds depend mainly upon the mechanical aspects of the motor construction, mainly its rotor stress and bearing life. Speeds of over 40,000 RPM are practical. Further, the motor is not voltage limited in its construction, and systems with horsepower ratings above 500 are practical.

CONSTANT HORSEPOWER OPERATION MODE

Figure 11:
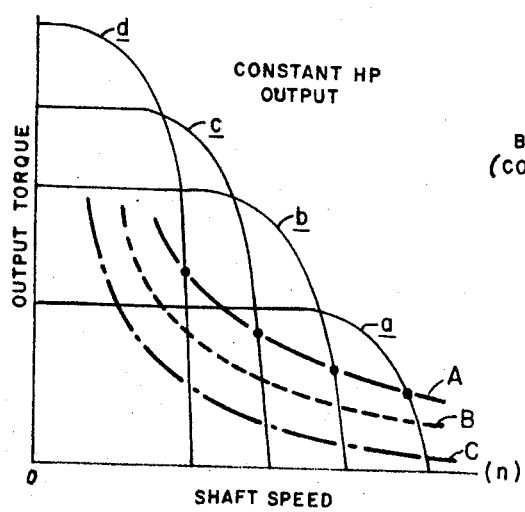
FIG. 11 is a family of curves of the constant horsepower operational mode of the motor system hereof.
Figure 12:
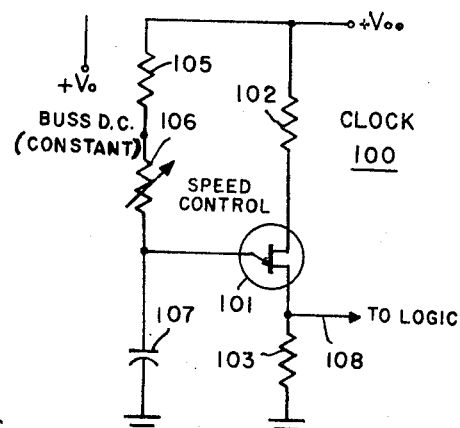
FIG. 12 is a circuit diagram of a control section that provides the constant horsepower operation of the motor system per FIG. 11.

FIG. 11 contains the family of curves A, B, and C with output torque vs shaft speed ($n$) in the constant horsepower output mode. FIG. 12 illustrates the control circuit for the motor system hereof for deriving such mode. To provide for such constant horsepower operation, the buss voltage (+$V_o$) to the motor system, for example that of FIGS. 1 and 8, is held at a constant magnitude during this motor operation mode. The buss voltage +$V_o$ in the exemplary circuit FIG. 12 is therefor not connected to the control section thereof. The resistance chain 105,106 of the clock 100 circuit control connects to the fixed biasing voltage +$V_{oo}$. The resistance of potentiometer 106 in this circuit is adjustable, to control the frequency of uni-junction transistor 101, which in turn is transmitted to the logic circuit via lead 108. The operating resistors 102, 103 are in the transistor circuit between +$V_{oo}$ and ground, with output lead 108 across resistor 103. The preset capacitor 107 connects with the emitter of uni-junction transistor 101 and the control resistance chain 105,106 and to ground potential. Capacitor 107 is preset as in the prior control sections.

For a given voltage setting of the buss (+$V_o$), say at 120 volts, the family of curves $a, b, c, d$ result at specific motor speeds ($n$) set by speed control 106. The peak torques of this curve family are the nominal torque, and represent an envelope higher to and parallel to the operating A curve. Curve A is for the said 120 volt setting of +$V_o$; the practical operation at this voltage over its speed range ($n$). For this mode of operation there is a minimum permissible or base speed as determined by the flux limit for the steel built into the motor. The motor speed is not dependent on the selected buss voltage (+$V_o$), but rather on the clock (100) frequency. The operating curves A, B, C represent constant horsepower output of the motor shaft at selected buss voltage. At lower buss voltage input (+$V_o$) to the motor, a lower torque operating curve results. Constant horsepower curve B represents for example a buss voltage (+$V_o$) of 60 volts impressed upon the motor system, with the +$V_{oo}$ viasing voltage kept constant, as at 5.0 volts. The motor speed is effected via potentiometer 106, as will now be understood.

It is to be understood that the constant horsepower output characteristic operation of the motor, as denoted by FIG. 11, results for given buss voltages (+$V_o$) maintained on the motor speed controlled at the uni-junction transistor or clock frequency control, potentiometer 106 herein. Equivalent circuit arrangements for this purpose may of course be used. The result denoted by the operating curves A, B and C for the selected buss voltages is similar to effecting field control on conventional dc motors. The constant horsepower operating range presented by these curves are limited to the speeds indicated by their curves A, B, C. These all have minimum or base speeds below which they should not be operated for any considerable time. The motor may be operated continuously under any combination of speed and torque represented by the area underneath a respective curve A, B or C.

The reason the motor hereof when operated in accordance with FIGS. 11 and 12 develops the locus of peak torque along a constant horsepower line is because the motor impedance at peak torque remains essentially constant, slip frequency being self-compensating. This factor combined with the factor that flux is inversely proportional to frequency applied to the motor, causes the torque to run inversely proportional to frequency, while the speed is proportional to frequency. This is because the torque is essentially a product of flux density time current of the motor. Thus it is seen that the product to torque and motor RPM is a constant, and hence the resultant horsepower operation hereof is at the constant mode.

CONSTANT TORQUE OPERATIONAL MODE

Figure 13:
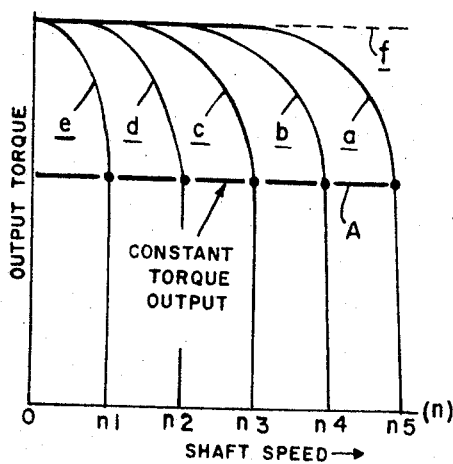
FIGS. 13 and 14 are families of operational curves of motor systems hereof with constant torque output characteristics.
Figure 14:
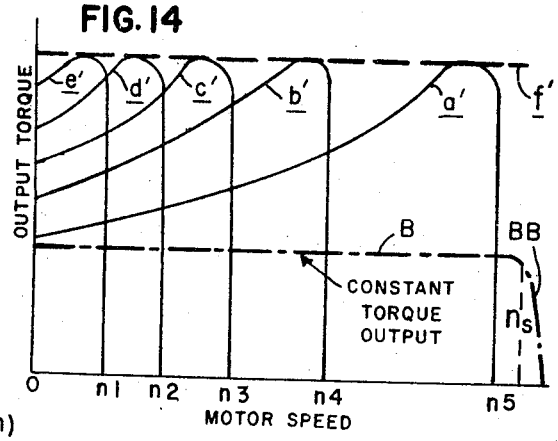

Reference is made to FIGS. 13 through 16. These figures illustrate the operation and the control section for providing constant output torque with the motor system hereof, at variable speed. FIGS. 13 and 14 illustrate respective rated operating constant torque output curves A and B of motors having different rotor resistance. The latter accounts for the diffe7ent shape of their torque-speed curves. The output curves A and B are similar to those obtained by armature control on convent6onal dc motors, effecting constant torque output throughout the speed range. It is noted that these curves actually provide rated torque at the output shaft all the way down to zero RPN. The family of curves *a* through *e* of FIG. 13 correspond to rotor impedance providing output torque-speed characteristics per curve *c* in quadrant (1) of FIG. 10. The corresponding curves *a'* through *e'* of FIG. 14 relate to rotor resistance bproviding curve *b* of FIG. 10. The respective peak torques are at *f* and *f'*. The rated torque curves A and B are at subst8ntially less torque levels for continuous operation. The downward sloped leg BB of torque curve B is an expanded indication of the torque curve B when extended behond the basic synchronous speed ($n_s$).

Figure 15:
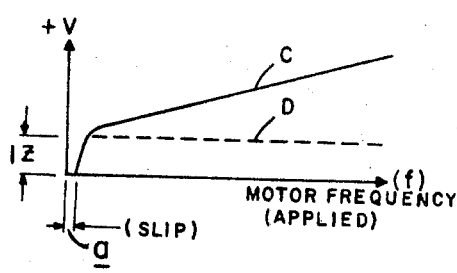
FIG. 15 is a graph of the compensation applied by the control section of the motor systems that provide the constant torque output modes of FIGS. 13 and 14.
Figure 16:
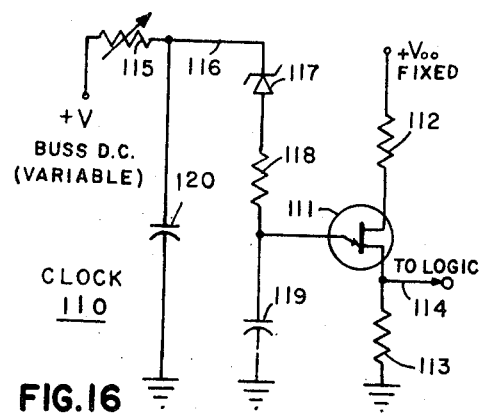
FIG. 16 is an electrical circuit diagram of the control section for the motor/control system hereof that provides compensation per FIG. 15 and constant torque operational characteristics per FIGS. 13 and 14.

To provide the constant torque output operation per FIGS. 13 and 14, compensation is provided in the control section, per FIG. 16. Such compensat6on corresponds to the product of motor current and its impedance (IZ). This is used to overcome the resistive component of the motor which is fixed while the buss voltage (+V) is varied. To maintain bconstant torque 4utput, the product ($V_m/f$)·$I_m$ is held constant. The fundamental motor frequency is $f$. The current that the motor draws is $I_m$; and $V_m$ is the voltage for the motor when its internal voltage drop is subtracted from the +V applied. The motor frequency ($f$) resultant in accordance with the compensation indicated per curve C in FIG. 15, provides the constant torque output characteristic A and B. Such frequency compensat6on curve is effected by the control section of FIG. 16 in conjunction with the varying applied buss voltage +V. Such result is obtained by placing Zener diode 117 in the circuit of clock 110. It allows the clock frequency, namely that 4*f* its uni-junction transistor 111 to change its frequency in a linear manner (C) above dashed level D vs applied buss voltage magnitude (+V). The reference line D corresponds to the internal motor IZ voltage drop referred to. The offset *a* corresponds to the slip required for maximum torque.

The control section FIG. 16 applies the resultant frequency from uni-junction transistor 111 via output lead 114 to the logic circuit. The resistors 112 and 113 complete the uni-junction transistor operating circuit, duly biased by fixed low voltage +$V_{oo}$. A potentiometer 115 is in the input circuit to the emitter of transistor 111, and connects with variable buss voltage +V. The variable +V potential may be derived from an arrangement per variac 70 and three-phase rectifier 73 of FIG. 8, as correspondingly provided bin FIG. 19, or otherwise. Te setting of potentiometer 115 is unchanged when constant torque output is desired. On the other hand, the horsepower rating of the output can be controlled through the setting of potentiometer 115 to superimpose constant horsepower control in conjunction with any torque setting. The Zener diode 117 is in series with potentiometer 115 and fixed resistor 118, to the emitter of transistor 111. The preset condenser 119 connects the emitter to ground. A capacitor 120 connects between the Zener diode at lead 116 and ground, and is adjusted to provide desired rate of acceleration or deceleration of the motor system. It is noted that the frequency output of clock 110 is slaved to voltage +V appl6ed to the system, with the practical linear relation (C) over the operational speeds, but effectively lower due to the level D established by the Zener diode (117) therefor.

The IZ component includes the internal effective motor resistance per conventional equivalent circuit analysis. If the motor had no equivalent resistance at all, constant torque output would occur by simply varying the applied buss voltage +V, without the Zener diode. This is because the synchronous frequency of the motor would be proportional to +V, as the clock frequency would be derived directly from such voltage input. However, as explained above, the compensated (C) motor frequency is used to overcome the internal IZ drop to effect the constant torque output characteristics per A and B of FIGS. 14, 15. The Zener diode 117 in series with the resistance chain 115, 118 to the emitter of the uni-junction transistor 111 does not function as a voltage regulator. Instead, the Zener diode in the clock control circuit hereof causes the uni-junction transistor, and therefor theclock frequency output, to function as though the applied buss voltage +V were lower by a predetermined amount. The compensated frequency resultant according to curve C of FIG. 15 is provided by the exemplary control section including the series Zener diode 117 in clock 110 to accomplish the constant torque mode.

TRACTION OPERATIONAL MODE

Figure 17:
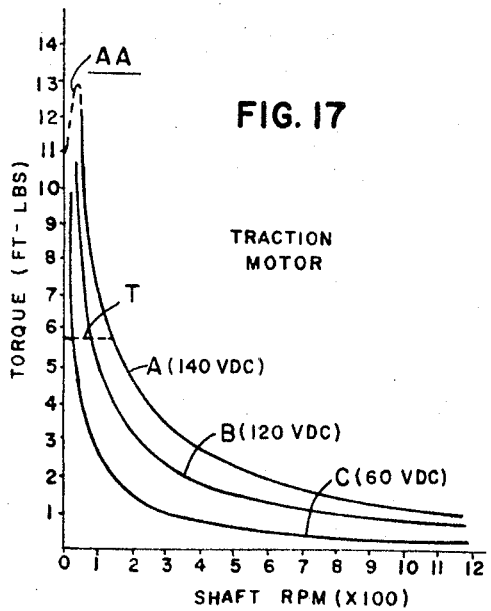
FIG. 17 is a family of curves in the traction operational mode of a motor/control system hereof.
Figure 18:
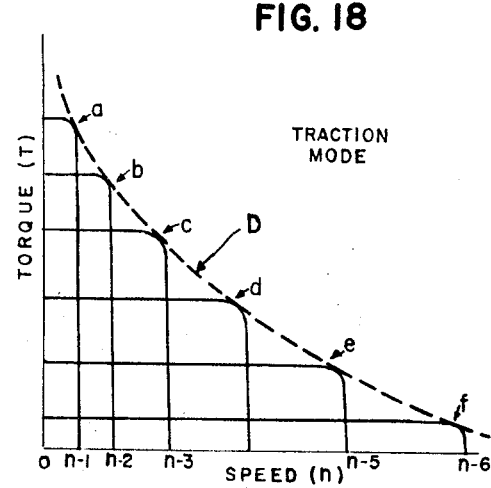
FIG. 18 is a diagram used to explain the traction mode of operation of the motor system.
Figure 19:
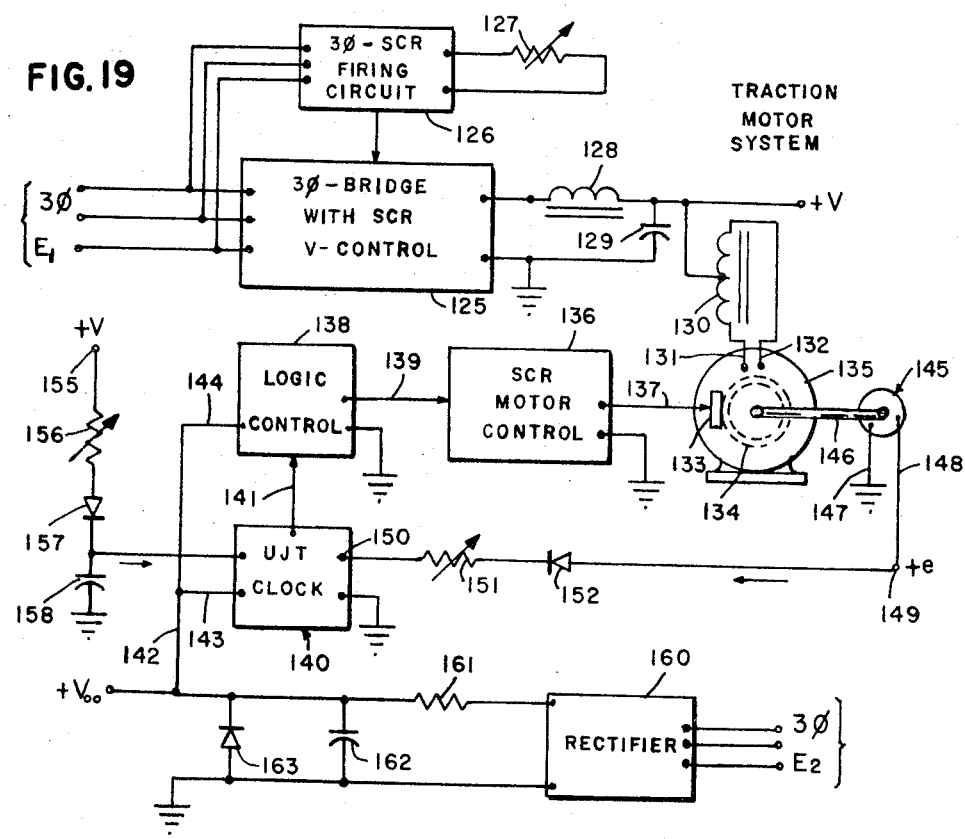
FIG. 19 is an overall schematic diagram of a motor/control system hereof that effects traction operational modes in accordance with FIGS. 17 and 18.

Reference is made to FIGS. 17, 18 and 19 in presenting the traction mode for the motor system hereof. Usual traction motors are direct current machines with field and 8rmature connected in series. As the armature speeds up its back EMF increases, that decreases current and weakens the field. As a result of the weakened field strength, the armature speeds up, increasing its back EMF to the level of the input voltage. This in turn weakens the field again. This process gives rise to the torque-speed characteristic of a series or traction dc motor. The invention motor system can advantageously be controlled to simulate such traction characteristics. FIG. 17 illustrates in curves A, B and C such mode, as derived from the system schematically illustrated in FIG. 19.

The motor systems hereof produce very high starting torques, with squirrel cage induction type rotors. Control sections are utilized that provide typically traction torque-speed type of curves as A, B and C. As indicated, higher traction curve A corresponds to constant dc applied voltage of 140 volts for +V; next curve B, by 120 volts; and lower curve C by 60 volts dc. It is understood that other applied buss voltages (+V) will produce corresponding traction curves in the family per FIG. 17. Advantageously, unlike series-wound dc motors, the traction motor system hereof cannot "run away" under no-load conditions. Also, since their synchronous speeds are controlled electronically, the motors hereof are readily speed limited without circuit breakers. This affords a substantial safety advantage over series-wound dc motors, and also permits the traction drives hereof to be used in applications that require occasional operation at even no load. By varying the dc buss voltage +V to the traction motor system of FIG. 19 in a manner to be described, a range of traction mode curves as A, B and C results. The dashed line curve T are positions below the corresponding curves A, B, C the motor may be safely used in continuous operaion.

FIG. 19 is a schematic electrical diagram of an exemplary motor/control system hereof including control section therefor for operation in the traction mode. The basic dc buss voltage (+V) is provided by three-phase bridge with SCR voltage control unit 125 energized by the three-phase power line at voltage $E_1$. The output voltage of three-phase rectifier 125 is phase-controlled in conventional manner by three-phase SCR firing circuit 126. A variable resistor 127 of circuit 126 is used to control its operation on bridge 125, and in turn controls the magnitude of unidirectional output dc buss voltage +V. A filter choke coil 128 and shunt filter capacitor 129 is utilized with advantage at the output rectifier 125. Buss dc voltage +V connects to the center tap of interphase transformer 130, the outer terminals of which are connected by leads 131, 132 to the two floating neautrals (N) of the stator windings within motor 135. A squirrel cage type rotor is indicated at 134 within motor 135. The basic SCR motor control unit 136 connects to the half-phase windings at terminal board 133 of the motor via cable 137. Correspondingly the logic control circuits 138 are connected by cable 139 to SCR motor control unit 136. The uni-junction transistor clock 140 is coupled to control logic unit 138 via lead 141. It is understood that SCR control 136, logic unit 138 and clock 140 have circuits and arrangements corresponding to those described hereinabove in connection with FIGS. 1 and 5. The bias voltage $+V_{oo}$, regulated to a substantially constant magnitude, connects via lead 142 to the appropriate connection in the clock via lead 143, and in the logic unit via lead 144.

A tachometer 145 mounted on shaft 146 of motor 135, accordingly rotates at a speed equal to or corresponding to that of the motor. Its output may be direct current, or rectified ac, at voltage e applied between ground 147 and lead 148 to terminal 149. The control voltage +e varies in accordance with the motor speed, and is coupled to the uni-junction transistor clock at its terminal 150 in series with variable resistance 151 and diode 152. The frequency of the uni-junction transistor within clock 140 is arranged to increase in accordance with increased magnitude of the +e output tachometer voltage impressed upon terminal 150. The buss voltage +V also connects to the uni-junction transistor clock circuit, through potentiometer 156 and series diode 157 as shown. A presettable shunt capacitor 158 is also in this circuit. The biasing voltage $+V_{oo}$ is derived from a three-phase rectifier 160 to which is applied three-phase voltage $E_2$, preferably reduced by transformer coupling to a low level for the exemplary five volts for $+V_{oo}$. The output of rectifier 160 comprises a series resistor 161, shunt filter capacitor 162, and diode 163 across it.

The operation of the traction mode, producing the output curves A, B, C per FIG. 17 is now described. Assume first that the motor is not rotating, and the power at buss +V is applied. Such application of the power as through contactors etc to power line $E_1$ is understood, and also connects the $E_2$ voltage for rectifier 60. The clock bias $+V_{oo}$ gives the motor a minimum slip frequency, and torque is thereby produced at a low speed, as n—1 in FIG. 18. If nothing else were to change, the motor would run along the curve indicated at a, tangent to dashed line envelope curve D. However, the motor shaft 146 turns the tachometer 145, raising the dc voltage applied to the clock 140. This directly raises the motor frequency, as will now be understood. The raised clock frequency provides the higher speed n-2 corresponding to the curve tangent at b.

This process continues, with higher output tachometer voltages being applied to clock 140, which in turn raises the clock frequency and in turn the motor speed, producing the successive curves c, d, e and f tangent to the dashed lines D, the latter being at n-6. This increasing speed and decreasing torque process continues until the load torque required in a particular installation keeps the motor from accelerating further. The dashed line curve D is the resultant torque-speed curve which is directly equivalent to that in dc traction motors. The comparable curves A, B and C in FIG. 17 are the result of such tachometer feed-back (e) to the clock (140) for respective applied dc voltages (+V) indicated. The potentiometer 156 is used for setting the minimum frequency of clock 140, for a selected applied voltage (+V). It is the basic combination effect of voltage +V applied to the motor system, and the generated tachometer 145 voltage (e) proportional to speed (n) that determines the clock frequency. The frequency to the logic unit 138, and in turn the basic (synchronous) motor frequency derived through the SCR motor control directly depend on this clock frequency. It is noted that change of dc buss voltage (+V) magnitude produces successive output curves as A, B and C. This is similar to the action of applied voltage change to a dc series traction motor. It is further noted that the dashed-curve loop AA at the left of the A curve peak is typical of the system hereof, all nevertheless at high starting torque at the low speeds.

The traction operational mode hereof provides curve shapes per A, B, C of FIG. 17 that are similar to constant horsepower output curves as A, B, C of FIG. 11. However, the traction curves extend operatively all the way down to stall, while significant minimum base speeds are required for operation in the constant horsepower mode. Further, operating speeds in the traction mode depend only upon the mechanical load on the motor, and not on the basic frequency set by the clock (140). High stall torque is developed at reduced frequency to the motor in the traction mode. The motor flux densities at stall are relatively high. The product of motor current times flux ($I_m \cdot B$) is thus large, resulting in high torque. The potentiometer 156 (FIG. 19) is used mainly to set up the system for the minimum frequency applied to the motor at start up. For example, 1.5 hertz would be a practical setting thereof. Also, potentiometer 151 is set for desired regenerative or dynamic braking by the motor system. It adjusts clock bias from the tachometer in setting for motor acceleration or deceleration corresponding to quadrant (2) operation in FIG. 10. Further, the motor system hereof, in traction mode, can be readily reversed in direction of rotation through simple logic connection in unit 138 by reversing the $\phi_a$, $\phi_b$, $\phi_c$ phase sequence. Such reversal or rotation is not feasible for dc traction series motors.

An important advantage of the traction motor system hereof is that is deliverable peak torques are at least ten times the rated torque of the motor. In standard polyphase motors, regardless of frequency or voltage applied, not much above three times rated torque can be realized. Such inherent limit of ac polyphase motors is due to their magnetic saturation. After their maximum flux density is reached, no higher density can occur, and therefor no higher induced rotor voltage or rotor current accomplished. It is the product of rotor current and gap flux density that produces torque. On the other hand, the quasi-sine stepped wave motor/control system hereof allows fast $d\phi/dt$ rotor linking of magnetic fluxes, even though flux density (B) be high. With a fairly long rotor time constant, such fast $d\phi/dt$ linkages allow rotor current to be induced and continue to flow while the flux density (B) reaches relatively high levels. Hence, the motor hereof simultaneously experiences high flux density and high operating current, with peak torque available at a level that the polyphase motors cannot match.

What is claimed is:

1. A polyphase motor system comprising a stator and an induction rotor, said stator containing a plurality of half-phase windings in paired consequent pole array with one pair for each effective phase for the motor in polyphase operation, a controlled rectifier for each of said half-phase windings, control means connected with said controlled rectifiers to selectively establish conduction periods therefor and thereby for their associated half-phase windings to provide a rotating magnetic field in the stator for corresponding operation of said induction rotor, and a generator responsive to the rotational speed of said rotor to provide a dc signal corresponding in magnitude to said speed, said dc signal being coupled to said control means whereby said rotor is operated in the traction mode.

2. A polyphase motor system as claimed in claim 1, in which said half-phase windings are arrayed about the stator with equal magnetic and physical separation between adjacent windings, associated windings of each pair being respectively interconnected into two symmetrical polyphase winding groups that are 180° apart magnetically in the stator.

3. A polyphase motor system as claimed in claim 1, in which said control means establishes the said conduction periods at respective 180° electrical separation between related half-phase pairs and thereby provide said rotating magnetic field in the stator.

4. A polyphase motor system as claimed in claim 2, in which said control means establishes the said controlled rectifier conduction periods at respective 180° electrical separation between related half-phase pairs in said winding groups and thereby provide said rotating magnetic field in the stator.

5. A polyphase motor system as claimed in claim 2, in which said half-phase windings are arrayed in the stator with relatively low mutual magnetic induction between the windings of respective pairs, whereby magnetic interaction among said stator windings cyclically effects self-clearing of the controlled rectifier conductions should any extend beyond its predetermined conduction period.

6. A polyphase motor system as claimed in claim 1, in which said control means includes a timing circuit that effects said successive conduction periods in equally spaced time intervals among said half-phase windings once during each cycle of applied motor frequency, said timing circuit having an electronic clock, and circuit means coupled to said clock and arranged to control its frequency and thereby the duration of said conduction periods to effect the said traction mode of operation of the induction rotor.

7. A polyphase motor system as claimed in claim 2, in which said control means includes a timing circuit that effects said successive conduction periods in equally spaced time intervals among said half-phase windings once during eacy cycle of applied motor frequency, said timing circuit having an electronic clock, and circuit means coupled to said clock and arranged to control its frequency and thereby the duration of said conduction periods to effect the said traction mode of operation of the induction rotor.

8. A polyphase motor system as claimed in claim 6, further including terminal means for connecting said half-phase windings to a source of dc operating voltage, said circuit means being arranged to vary the frequency of said clock and effect the said traction mode of operation of the rotor.

9. A polyphase motor system as claimed in claim 6, further including a generator responsive to the rotational speed of said rotor to provide a dc signal corresponding in magnitude to said speed, said dc signal being coupled to said circuit means to correspondingly change the frequency of said clock, whereby said rotor is operated in the traction mode.

10. A polyphase motor system as claimed in claim 7, further including a generator responsive to the rotational speed of said rotor to provide a dc signal corresponding in magnitude to said speed, said dc signal being coupled to said circuit means to correspondingly change the frequency of said clock, whereby said rotor is operated in the traction mode.

* * * * *